United States Patent

[11] 3,573,832

[72] Inventor John D. Callaghan
Cherry Hill, N.J.
[21] Appl. No. 861,200
[22] Filed Sept. 25, 1969
[45] Patented Apr. 6, 1971
[73] Assignee RCA Corporation
Continuation of application Ser. No. 577,640, Sept. 7, 1966, now abandoned.

[54] UHF TELEVISION ANTENNA
5 Claims, 5 Drawing Figs.

[52] U.S. Cl. .......... 343/742, 343/866
[51] Int. Cl. .......... H01q 11/12
[50] Field of Search .......... 343/741—2, 702, 720, 866—7

[56] References Cited
UNITED STATES PATENTS

| | | | |
|---|---|---|---|
| 2,842,765 | 7/1958 | Schmitt | 343/742X |
| 3,051,952 | 8/1962 | Pifer | 343/741 |
| 3,233,240 | 2/1966 | Reynolds | 343/741X |

*Primary Examiner*—Herman Karl Saalbach
*Assistant Examiner*—Marvin Nussbaum
*Attorney*—Eugene M. Whitacre

ABSTRACT: A UHF television band antenna includes two or more conductive loops, at least one of which is broken and is provided with terminals adapted for connection to a television receiver. One of the loops has a perimeter equal to one wavelength at a frequency within the UHF band. The loops are positioned and interconnected in such a fashion that no subloop, formed by unbroken lengths of wires defining two or more of said loops, has a perimeter equal to the wavelength corresponding to any frequency within the UHF band.

Figures 1A, 1B, 2A, 2B:
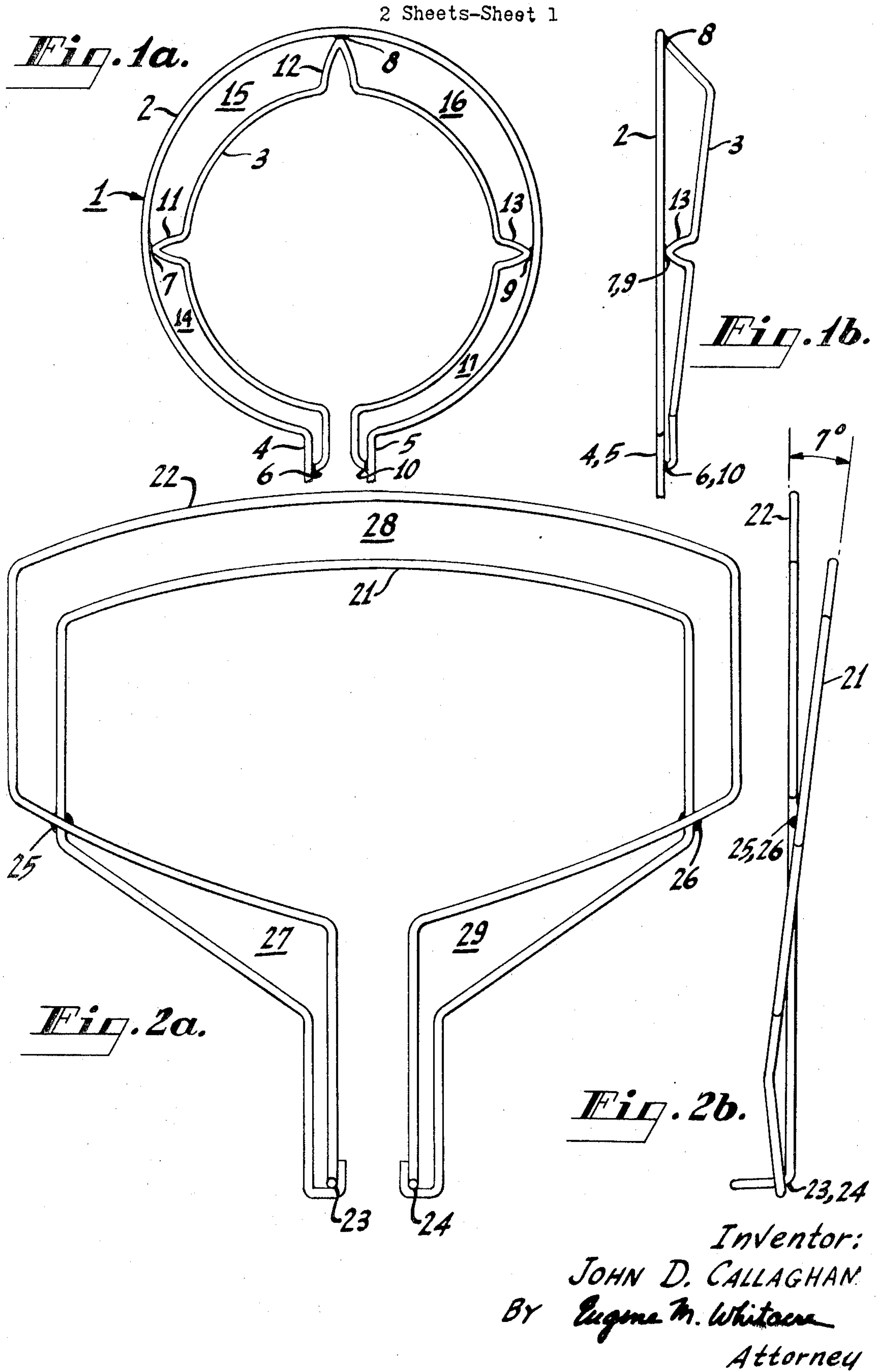

Inventor:
JOHN D. CALLAGHAN
BY Eugene M. Whitacre
Attorney

Inventor:
JOHN D. CALLAGHAN
By Eugene M. Whitacre
Attorney

UHF TELEVISION ANTENNA

This is a continuation of application Ser. No. 577,640, filed Sept. 7, 1966.

This invention relates to ultra high frequency (UHF) antenna devices and more particularly to UHF indoor antennas for television receivers which exhibit high gain and bandwidth characteristics yet have aesthetic features suitable for home decor.

One type of UHF antenna for television receivers employs a circular loop, the circumference of which is equal to one wavelength at a frequency in the UHF band. This loop, while having relatively high gain and broad bandwidth characteristics, is physically plain and does not add much to the final appearance of a complete indoor antenna assembly. As these UHF loops are employed principally in locations where physical attractiveness is a large factor, the overall acceptability of the unit is largely determined by its general appearance and eye appeal.

An object of this invention is to provide an improved UHF antenna.

Another object of this invention is to provide an improved UHF indoor television antenna with high gain and bandwidth characteristics.

Another object of the invention is to provide an improved indoor UHF antenna which is susceptible of aesthetic designs while having good electrical performance characteristics.

The foregoing objects and others which may appear from the following detailed description are attained by providing a UHF television band antenna which includes two or more conductive loops, at least one of which is broken and is provided with terminals adapted for connection to a television receiver. Also, one of said loops has a perimeter equal to one wavelength at a frequency within the UHF band. These loops are positioned and interconnected in such a fashion that no subloop, formed by unbroken lengths of wires defining two or more of said loops, has a perimeter equal to the wavelength corresponding to any frequency within the UHF band. Likewise, the perimeter must not be equal to a wavelength of a subharmonic of a frequency within the UHF band. It has also been established that if such a closed conductive path is resonant at a frequency within the desired operating range of the antenna, its coupling to the antenna may cause it to absorb an appreciable amount of the energy picked up by the antenna at the resonant frequency and such energy will circulate in the closed path rather than flow to the antenna terminals adapted to supply the receiver input. This results in a "suck out," or substantial deterioration in the performance of the antenna.

Figure 3:
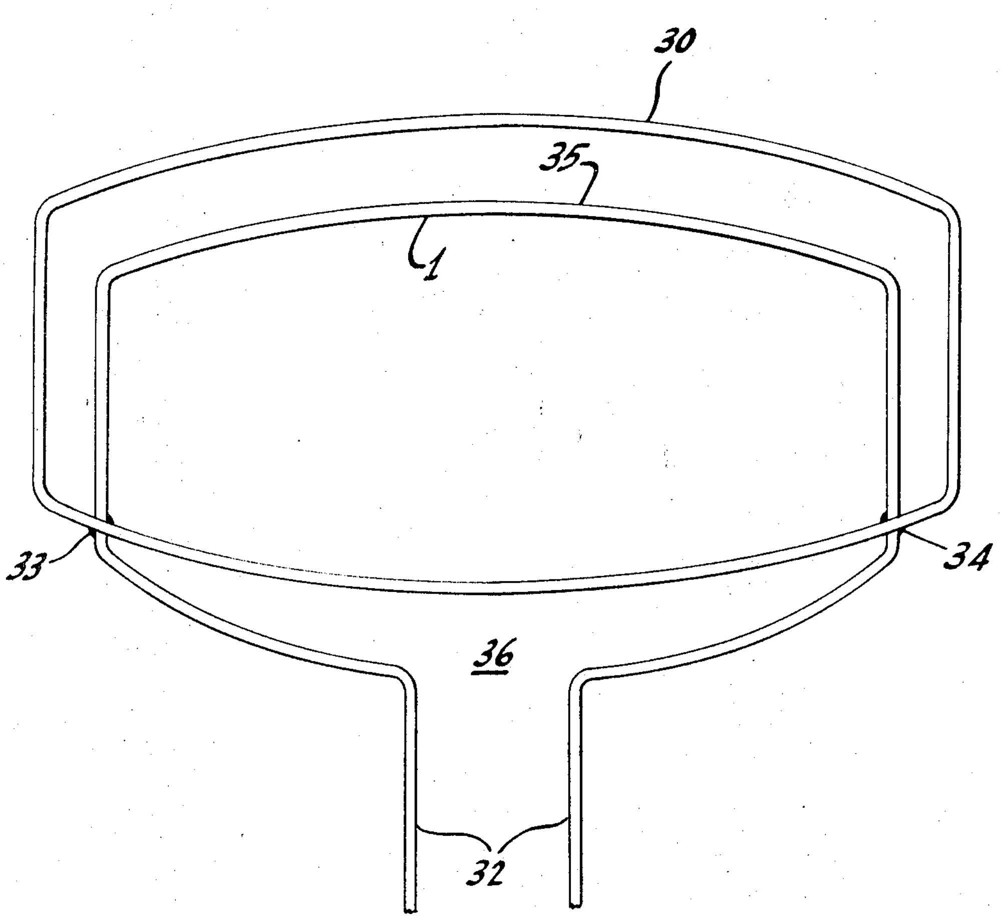

Other objects, features and advantages will appear from the drawings and descriptions hereinafter given. Referring to the drawings:

FIGS. 1*a* and 1*b* illustrate the front and side views respectively of a UHF loop antenna embodying the present invention;

FIGS. 2*a* and 2*b* illustrate the front and side views respectively of still another UHF loop antenna embodying the present invention; and FIG. 3 illustrates a front view of a closed loop embodiment of the present invention.

FIGS. 1*a* and 1*b* illustrate a two-loop antenna 1 comprising an outer loop 2 and an inner loop 3, each of which is broken at one portion to form distal ends or terminal portions 4 and 5. As seen from FIG. 1*b*, the inner loop 3 is in a different plane than the outer loop 2. The inner loop 3 is directly electrically connected to the outer loop 2 at points 6, 7, 8, 9 and 10. This is accomplished by forming hairpin bends 11, 12 and 13 in the inner loop 3. The connections 7, 8 and 9 serve to break up the large subloop or conductive path which would otherwise be created by the wires forming loops 2 and 3. Subloops are loops which are defined by the joining of wires making up two or more main loops. As can be seen in FIG. 1*a*, four subloops surrounding the areas 14, 15, 16 and 17 have been created by the intersections of the inner loop 3 with the outer loop 2. The subloops are resonant circuits in the form of closed loops which, at their resonant frequency, couple energy from the antenna. It is important that this fact is taken into account by defining the subloops in such a manner that their resonant frequency will fall outside of the operating range over which the antenna is intended to be used. To insure that no subloop has a resonance inside of the UHF band, their perimeters are chosen to be unequal to a wavelength corresponding to any frequency within this band.

The connections established by the antenna loops are made by an actual joining of the loops directly or by using very short connecting wires. This insures that no subloop having a resonance within the UHF band exists and avoids suck-out within the operating range of the antenna. Such might occur if a simple shorting bar were used rather than the hairpin direct connections. The impedance of such a shorting bar can be relatively high at UHF frequencies (causing it to look like an open circuit) compared with the impedance of the larger subloop, effectively negating its function. The hairpin structure further serves to destroy the integrity of the large subloop. The connections between the inner and outer loops of this embodiment may be made by welding, but, however, any good conductive connection is as effective.

FIGS. 2*a* and 2*b* illustrate another embodiment of the present invention. The antenna shown consists of an inner loop 21 and an outer loop 22 joined at distal ends or terminal portions 23 and 24 and also at points 25 and 26. The connections at points 25 and 26 break up the large subloop that would be created by the wire forming the individual loops 21 and 22, and form smaller subloops surrounding the areas 27, 28 and 29. Connections 25 and 26 may consist of solder points or welds or any other means which would act as a low impedance or a short circuit over the operating range to insure that the large subloop will in fact be broken up into the smaller subloops. In addition to insuring that the connections between the loops are of a low impedance it is also desirable that the geometry of the antenna area be such that large subloops are physically not present so that antenna current will not flow through them in addition to flowing around the smaller subloops.

The embodiment disclosed in FIGS. 2*a* and 2*b* comprises another antenna which also features a desired combination of overall antenna gain, impedance, and general appearance. The spacing between the inner and outer loops, particularly the portions that are parallel to each other, can be adjusted to vary the impedance of the antenna as viewed from the terminals. Further, the apertures of the loops have been formed to a substantially rectangular configuration whose ratio of width to height is approximately 2 to 1. As seen from FIG. 2*b*, the inner loop is canted back at an angle of approximately 7° from the larger loop. This has been found to result in a spacing between the two loops which gives the antenna a desired 300 ohm impedance at the feed point.

FIG. 3 illustrates another embodiment of the invention antenna which employs an unbroken loop 30 and a loop 31 which is broken to form distal ends 32. These loops are electrically connected at 33 and 34, forming subloops surrounding the areas 35 and 36. As in the embodiments shown in FIGS. 1 and 2, the subloops have perimeters which are not equal to a wavelength corresponding to any frequency of the antenna operating range. This closed loop arrangement performs well so long as sufficient wire in the closed loop is put across the terminal points such that a high impedance is maintained across said points over the frequency range of the antenna.

I claim:

1. An antenna for intercepting signals in the UHF television band comprising:
   - a plurality of loops of electrically conductive material, said loops having different perimeter sizes;
   - at least one of said loops being broken at one portion to form distal ends, said one loop having a perimeter substantially equal to a wavelength corresponding to a frequency within the UHF television band and having spaced points on said conductive material in physical contact with spaced points on another of said loops, a pair of said distal ends providing a means for connection of said antenna to a receiver;

short circuit means connecting said one loop at said spaced points removed from said distal ends to said other of said loops such that none of the subloops resulting from the connections of said loops has a perimeter equal to a wavelength corresponding to any frequency within the UHF television band.

2. An antenna as defined in claim 1 in which some of the loops are directly joined at said spaced points by variation of the shapes whereby the loops are made to intersect.

3. An antenna as defined in claim 1 in which some of the loops are placed in respectively different but intersecting planes so that they may be electrically interconnected at said intersections.

4. An antenna for use with a UHF television receiver comprising:

a plurality of loops of electrically conductive material each broken at one portion to form distal ends, said loops overlapping and in contact with each other at points spaced from said ends and each having a different perimeter, at least one such loop having a perimeter of one wavelength corresponding to a frequency within the UHF band;

terminal means for attachment of at least one of the loops to a receiver;

short circuit means interconnecting said loops at their distal ends and at said points spaced therefrom so that no subloops, formed by the joining of conductive material defining two or more loops, has a perimeter equal to a wavelength corresponding to any frequency within the UHF band.

5. An antenna as defined in claim 4 in which some of the loops are placed in respectively different but intersecting planes so that they may be electrically interconnected at said intersections.